Feb. 27, 1968     K. H. CARPENTER     3,370,540

PUMP CONSTRUCTION

Filed Dec. 23, 1965

INVENTOR.

Keith H. Carpenter

BY Donald P. Selwecki

HIS ATTORNEY

United States Patent Office 3,370,540
Patented Feb. 27, 1968

3,370,540
PUMP CONSTRUCTION
Keith H. Carpenter, Kettering, Ohio, assignor to General Motors Corporation, Detroit, Mich., a corporation of Delaware
Filed Dec. 23, 1965, Ser. No. 515,836
5 Claims. (Cl. 103—4)

ABSTRACT OF THE DISCLOSURE

A dual pump construction comprising a first gear pump which is adapted to be driven by a power source and a second gear pump which is magnetically driven by the first gear pump is disclosed. The first and second gear pumps are preferably external and internal ring gear pumps, respectively, and physically separated so that separate fluids can be pumped thereby.

---

This invention relates to pump apparatus and more particularly to a ring gear pump magnetically driven by an external gear type pump.

It is desirable in windshield wiper systems of the hydraulic type to have a pump supplying pressure therefor which is driven by the vehicle engine. In the interest of economy and certain design considerations, it is desirable that this windshield wiper fluid motor pump be driven by a portion of the vehicle engine that is in operation at any time that the engine is operating. The engine oil pump provides such a source of power but, due to the criticality of operation thereof, it is imperative that the operation of the engine oil pump be not interfered with. For example, a windshield wiper fluid motor could be directly driven by the same shaft as the engine oil pump but the possibility exists that a locked windshield wiper would jam the engine oil pump causing it to become inoperative. Any other type of direct drive mechanism from the engine oil pump that would prevent absolutely the locking thereof would involve expensive structure and is therefore economically infeasible.

It is an object of the present invention to provide improved pumping apparatus wherein a driven gear pump magnetically drives a second pump.

It is another object of the present invention to provide improved pumping apparatus wherein an external gear engine oil pump magnetically drive an internal ring gear pump for operation of the windshield wiper fluid motor.

It is still another object of the present invention to provide improved pumping apparatus wherein an external gear type pump having a driven member and a driving member is rotating in opposite directions to magnetically drive an internal gear pump in a given direction.

It is still a further object of the present invention to provide improved pumping apparatus which carries out the aforementioned objects in a simple and economical manner.

Further objects and advantages of the present invention will be apparent from the following description, reference being had to the accompanying drawings wherein a preferred embodiment of the present invention is clearly shown.

Figure 1:
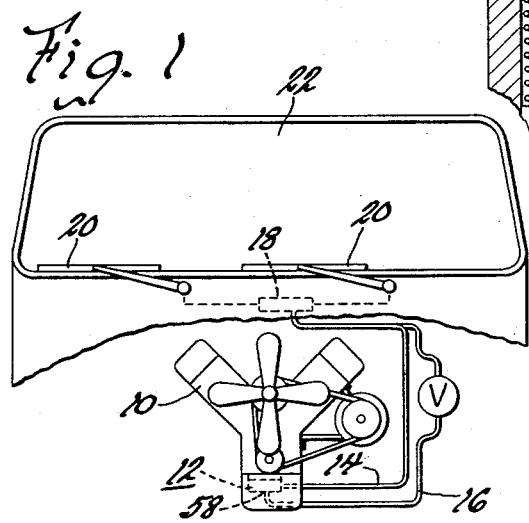
FIGURE 1 is a diagrammatic illustration of a windshield wiper system hydraulically driven by power supplied from an engine oil pump.

Referring to FIGURE 1, an engine 10 has a pump 12 which supplies fluid under pressure through lines 14 and 16 to operate fluid motor 18. Fluid motor 18, in any well-known fashion, causes wipers 20 to oscillate across windshield 22 to provide a wiping action.

Figure 2:
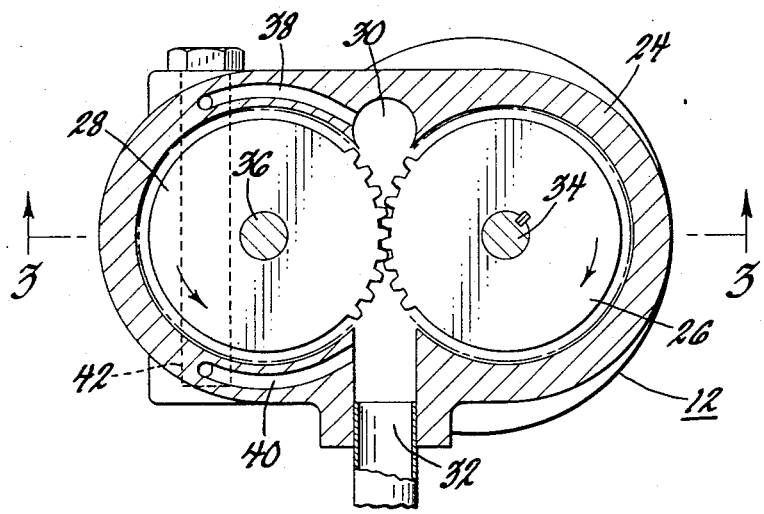
FIGURE 2 is a sectional view taken along line 2—2 of FIGURE 3.

Referring to FIGURE 2, pump body 24 carried in the crankcase of engine 10 comprises a drive member 26 and a driven member 28. Members 26 and 28 are substantially identical external type gears which rotate in opposite directions in a well-known manner to provide a build-up in pressure in fluid entering inlet 30 and discharging in outlet 32. Driving member 26 is driven in any well-known manner by engine 10 such as by means of shaft 34 extending through body 24 as seen in FIGURE 3.

Figure 3:
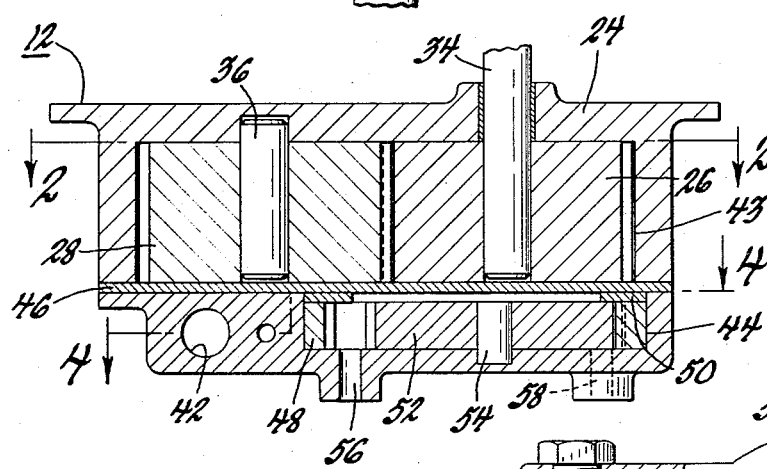
FIGURE 3 is a sectional view taken along line 3—3 of FIGURE 2.

Referring to FIGURE 3, driven member 28 is carried by shaft 36 which in turn is rotatably carried by body 24. Pump 12 includes by-pass passages 38 and 40 cooperating with piston chamber 42, best seen in FIGURES 3 and 4, to provide a pressure unloading means for pump 12.

Referring to FIGURE 3, pump body 24 is separated into two compartments, a first of which houses members 26 and 28 and a separate compartment 44 which houses an internal ring gear type pump utilized for powering fluid motor 18. Impermeable member 46 separates gear pump compartment 43 from compartment 44 and allows separate fluids to be pumped in two compartments. Internal gear element 48 has magnetic material 50 peripherally carried thereon in juxtaposition to both members 26 and 28 on the opposite side of member 46. Cooperating external gear member 52 is rotatably carried on shaft 54 in turn carried by body 24.

Figure 4:
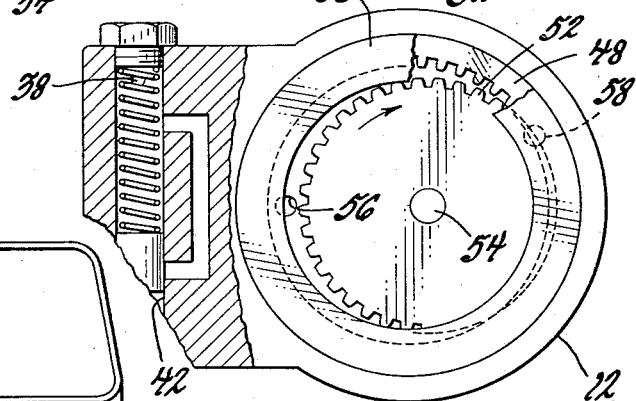
FIGURE 4 is a sectional view taken along line 4—4 of FIGURE 3.

Referring to FIGURE 4, it is seen that external gear member 52 is driven by internal gear element 48 and mesh together in a manner causing a pressure build-up from fluid entering at inlet 56 and leaving body 24 at outlet 58. It should be noted that drive member 26 and driven member 28 are themselves composed of magnetic material allowing responsive rotation of element 48 during operation of members 26 and 28.

In operation, the windshield wiping system described herein operates only when the engine 10 is in operation. Engine 10 drives pump 12 in any well-known manner, for example, by drive gears supplying oil under pressure to the engine by the contra-rotating members 26 and 28. Pump 12 is a conventional external gear type pump.

Fluid motor 18 is a conventional fluid operated servo motor imparting an oscillatory sweep to wipers 20. Power for fluid motor 18 is provided by the internal gear type pump carried in compartment 44 of pump body 24.

Referring to FIGURE 3, when the engine is running, shaft 34 carrying member 26 engages driven member 28 to provide a pumping action. The rotation of drive member 26, because of its magnetic qualities, sets up a magnetic field which attracts the magnetic material 50 carried by gear element 48 resulting in a responsive rotation thereof. As seen in FIGURE 4, rotation of element 48 results in a rotation of external gear member 52 due to their meshed relationship resulting in a pressurizing of the fluid from inlet 56 at outlet 58. Outlet 58 communicates with line 16 in turn communicating the fluid under pressure to the fluid motor 18.

As long as an appropriate valve in line 16 is left open, the windshield wipers operate and a wiping action results. A closing of this valve or similar fluid blocking means will result in the stopping of the windshield wiping action and will result in a stalling of the magnetically driven pump. Due to the magnetic drive arrangement between the ring gear pump and the oil pump, operation of the oil pump continues without interruption.

Therefore, merely opening a fluid blocking means in line 16 results in the routing of pressure from the ring gear pump to the windshield wiper fluid motor 18.

Utility of the subject invention is particularly apparent in the environment of a windshield wiper system driven by an engine oil pump but it is equally obvious that a particular invention finds utility in any environment where it is appropriate or desirable to have a fluid pumping system operate on demand only in pumping a particular fluid while the constantly operating pump pressurizing a different type fluid in a separate system remains unaffected.

While the embodiment of the present invention, as herein disclosed, constitutes a preferred form, it is to be understood that other forms might be adopted.

What is claimed is as follows:

1. A pumping apparatus comprising a first gear pumping means including a drive gear which is adapted to be driven from a power source and having an inlet and outlet for ingress and egress of fluid, respectively, second gear pumping means including a pair of rotatable cooperating gears located adjacent said first gear pumping means and having an inlet and outlet for ingress and egress of fluid, respectively, magnetic means for magnetically effecting rotation of said cooperating gears of said second pumping means in response to rotation of said drive gear of said first pumping means, and means for physically separating said first and second gear pumping means so that separate fluids can be pumped by said first and second gear pumping means.

2. Pumping apparatus according to claim 1 wherein said first gear pumping means is an external gear pump and said second gear pumping means is an internal ring gear pump.

3. A dual pump comprising: an external gear pump including a drive gear driven by a power source and having an inlet and outlet for fluid; an internal gear pump including an internal gear driver and an external gear driven member, said internal gear driver following movement of the drive gear of said external gear pump and engaging said external gear driven member to create a pressure rise in fluid circulated therethrough.

4. A dual pump according to claim 3 wherein said external gear pump has two rotatable magnetic elements attracting said internal gear driver to cause a rotation thereof in a pumping action generated by a cooperation therewith of said external gear driven member.

5. A dual pump according to claim 3 wherein said external gear pump is an engine driven oil pump for engine lubrication and said internal gear pump is a windshield wiper fluid motor magnetically driven by said engine driven oil pump.

References Cited

UNITED STATES PATENTS

| | | | |
|---|---|---|---|
| 2,534,520 | 12/1950 | Katcher | 103—126 |
| 2,769,394 | 11/1956 | Lauck | 103—126 |
| 2,937,803 | 5/1960 | Cunningham | 103—87 |
| 3,016,834 | 1/1962 | Deska et al. | 103—126 |
| 3,037,455 | 6/1962 | Bozimowski et al. | 103—4 |
| 3,045,896 | 7/1962 | Compton et al. | 103—6 |
| 3,080,495 | 3/1963 | Sudmeier | 230—15 |
| 3,244,111 | 4/1966 | Shelhart | 103—4 |
| 3,261,298 | 7/1966 | Wilson | 103—118 |

FOREIGN PATENTS

| | | |
|---|---|---|
| 1,339,539 | 9/1963 | France. |

DONLEY J. STOCKING, *Primary Examiner.*

W. J. KRAUSS, *Assistant Examiner.*